Figure 1:
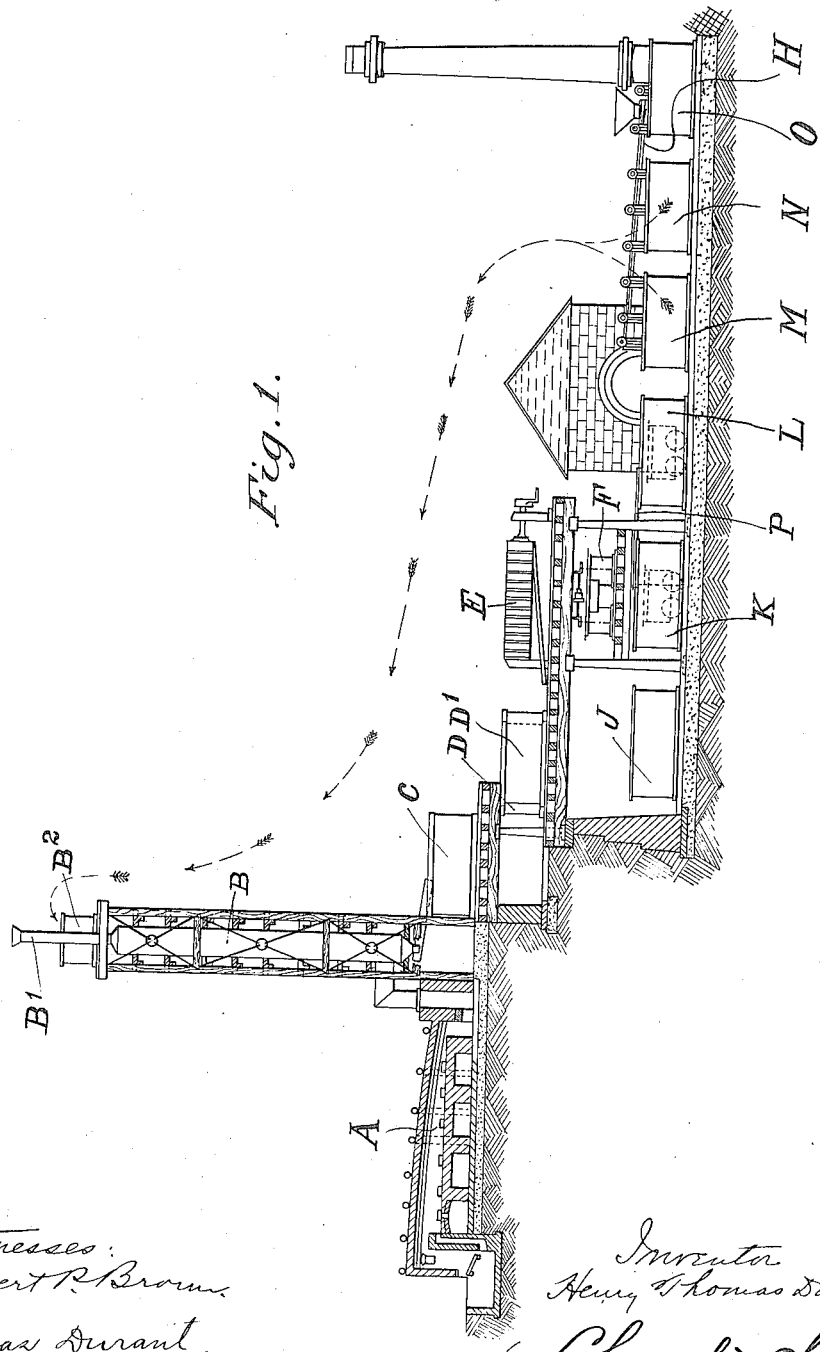

UNITED STATES PATENT OFFICE.

HENRY THOMAS DURANT, OF LONDON, ENGLAND, ASSIGNOR TO THE METALS EXTRACTION CORPORATION LIMITED, OF LONDON, ENGLAND.

EXTRACTION OF ZINC FROM ITS ORES OR PRODUCTS.

1,180,765.  Specification of Letters Patent.  Patented Apr. 25, 1916.

Application filed May 4, 1914. Serial No. 836,313.

*To all whom it may concern:*

Be it known that I, HENRY THOMAS DURANT, a subject of the King of England, residing at Finsbury House, Blomfield Street, London, England, have invented certain new and useful Improvements in the Extraction of Zinc from Its Ores or Products, of which the following is a specification.

This invention is for improvements in or relating to the extraction of zinc from its ores and concentrates or from complex ores or products, that is to say from all ores or products whether natural or artificial which contain zinc with or without other metal values such as lead, copper, silver or gold.

This invention consists in improvements and modifications in the processes of the Metals Extraction Corporation Limited, as described for example in the previous United States Patents Nos. 875,866, 999,213, 1,074,203 and 1,073,363.

When the zinc in the ore or product in question exists either as oxid, carbonate, silicate or sulfate, the material is treated by the process under consideration merely after suitable crushing. But when the zinc in the ore or product in question exists as sulfid then the material is first roasted so as to convert the zinc into oxid or sulfate or a mixture of both.

Throughout this specification the word ore is used to denote any ore or other metalliferous product containing zinc.

Where the ore contains zinc mainly as oxid, carbonate, silicate, or sulfate, some other source of sulfur is necessary to produce furnace gases, *i. e.* the $SO_2$.

Ores may be crushed to the degree of fineness ultimately required and then if necessary roasted, or they may be coarsely crushed before roasting and if necessary further crushed after roasting. The ore after roasting if necessary is screened, so as to give a coarse or leachable and a fine or non-leachable product. Obviously the ore may be so "fine" that it contains no coarse or leachable product, in which case the leaching tanks are not used and the whole of it is treated in filter presses or equivalent apparatus as hereinafter described.

According to previous practice the ore containing zinc, having been first roasted if necessary, was suspended in water and brought into intimate contact with a gas containing $SO_2$ (such as roasting furnace gas) for the purpose of causing the zinc to go into solution as bisulfite, and this operation was generally carried out in an apparatus of the type described in United States Patent No. 999,213, or in a solution barrel or in a combination of these devices. When the ore or product requires roasting it has hitherto been necessary to roast the material in muffle furnaces in order to obtain the $SO_2$ in concentrated form.

One object of this invention is to simplify the method of solution.

Another object of this invention is to allow of the employment of reverberatory furnaces which are very much simpler and commercially more economical than muffle furnaces.

A third object of this invention is to provide a cyclic process in which the highest possible extraction of zinc can be readily obtained, while if still of value the residues after the process treatment are produced in a suitable form for further treatment, whether smelting or concentration, for recovery of those metal values other than the zinc and some of the copper which goes into solution with the zinc.

According to this invention the process for the extraction of zinc from its ores or products consists in introducing crushed material (previously roasted if necessary) into a filter press or leaching tank and leaching the material with a solution of sulfur-dioxid ($SO_2$) as hereinafter described.

A feature of this invention when roasting is required consists in roasting the ore or product in a reverberatory furnace and passing the furnace gases into an absorption tower, supplied with circuit solution which contains mainly zinc sulfate and is fairly free from sulfites so as to produce a dilute solution of sulfur-dioxid ($SO_2$) which solution is employed for leaching the ore. Circuit solution is the name given to all the zinc bearing solutions—such solution only being classified as will be hereinafter explained for the purpose of recovering its metal values.

A further feature of this invention when roasting is required consists in roasting the ore or product so as to produce mainly sulfate of zinc, whereby the first runnings of solution obtained from the filter-press or leaching tank are rich in zinc sulfate while the solutions subsequently leached off contain mainly zinc sulfite.

Figure 2:
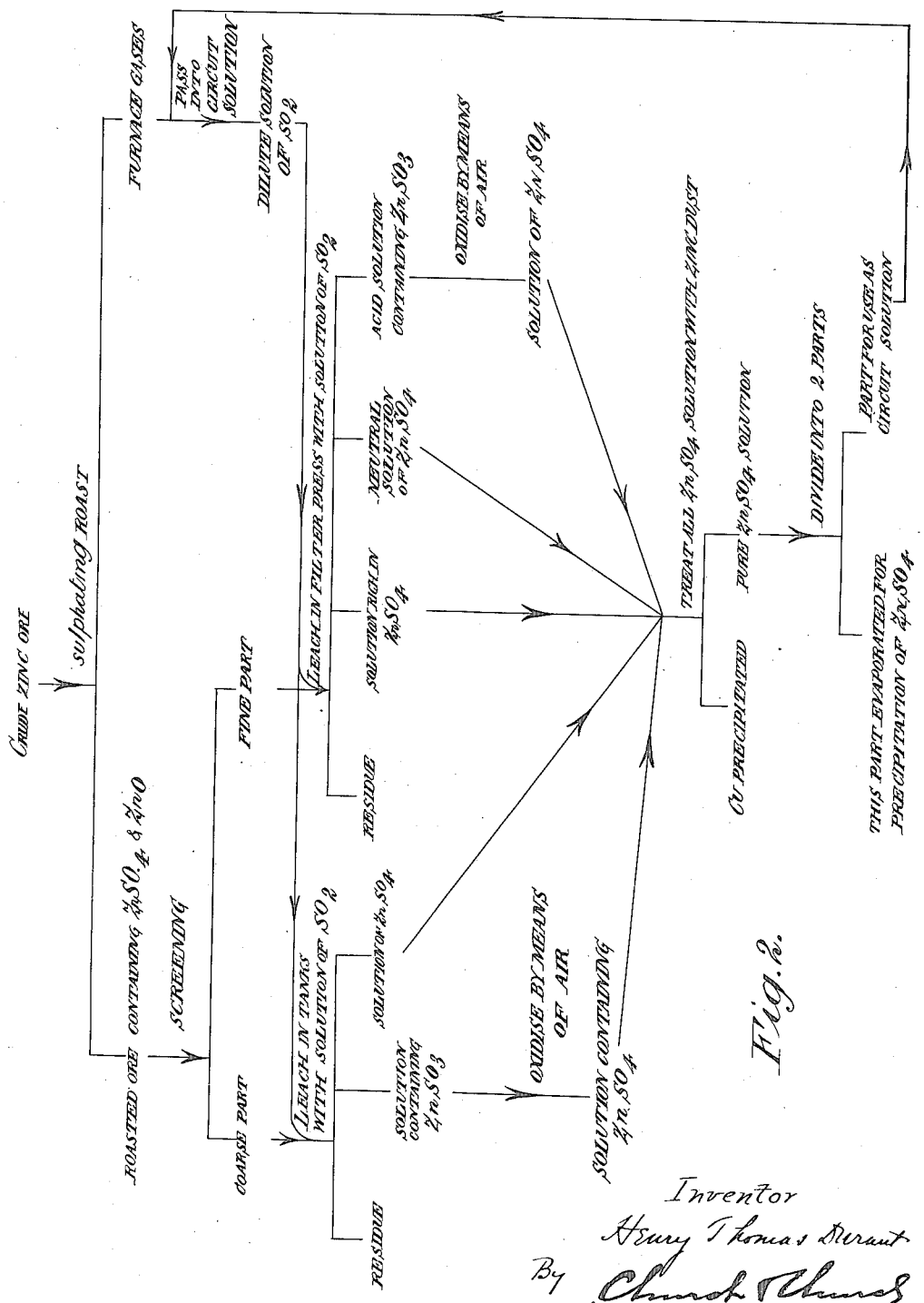

Figure 1 is an elevation of a suitable plant for carrying out the present process. Fig. 2 is a diagrammatic view showing the various steps of the present process.

The ore (or other material as a source of sulfur) is roasted in a furnace "A" so as to give off $SO_2$ containing gases. This furnace may be either a muffle, such as a Hasenclaver or Merton furnace, or may be a reverberatory furnace. The ore or product is roasted so as to obtain as large a percentage of sulfate as possible. The furnace gases are passed into and up an absorption tower "B", and from the tank "$B_2$," the circuit solution is delivered to the top of the tower, so that a solution of $SO_2$ is produced therein and discharged at the bottom into the tank "C" which acts as a storage. Preferably there is employed a cone tower as described for example in our previous United States Patent No. 999213 but the tower shown as "B" may be replaced by any other device for scrubbing a gas with a solution or water. The flue gases from which $SO_2$ has been removed wholly or in part escape through a chimney "$B^1$" of the tower "B".

The coarse leachable product before mentioned is treated with the $SO_2$ circuit solution in ordinary leaching tanks "D" and "$D^1$" in which the solution passes through under its own pressure due to its static head.

To prevent caking of the material in the initial stages of the leaching it may be necessary either to use a small quantity of the circuit solution hot or to agitate the coarse roasted ore or product with about its own weight of the circuit solution in a pulping tank "F" or the like before running into the leaching tank.

The leaching may be carried out in one tank until most of the zinc is extracted; the partially treated material may then be transferred to another tank for further leaching, in this way the zinc is extracted more easily and thoroughly. This procedure is generally advisable, as the transference from one tank to another breaks up the leaching channels in the material. After treatment is finished the residues from leaching are water washed and are then commercially zinc free and can be treated for other metal values they may contain.

The fine non-leachable product is pulped up with circuit solution in a pulping tank "F" or the like, and is pumped by a force pump into a filter, preferably a filter press "E." In pulping, enough solution is used to give a ratio of solid to liquid of about 1:1, that is to say, the pulp should be quite thick so as to prevent segregation and stratification in the press and to insure uniformity in the cakes in the press and consequently efficient washing in the subsequent stage of the process. The filter press employed may be large, for example a single unit may have a capacity from one ton up to six tons.

After the pulped up fines have been pumped into the filter press the circuit solution is pumped in by means of the washing pump by way of the washing inlet. As the solutions leached from the coarse material are exactly comparable with those that leave the filter press it is only necessary to consider these latter. The first runnings of solution from the filter press are rich in zinc sulfate, the amount of this solution being about equal to the amount of circuit solution used for pulping up the fine non-leachable product previous to pumping it into the filter press. This sulfate solution is separately stored in the tank "L." The next solution which runs from the filter press is poorer in zinc—this solution is neutral (i. e. free from free acid) and is separately stored in the tank "K." Finally solution containing free acid will leave the filter press; this solution is also separately stored in the tank "J."

When it is shown by testing that the amount of free acid leaving the filter press approximates to the amount entering, the charge of fines in the filter press has finished its first treatment. The filter press may then be discharged, and the partially treated material from the filter press may, to make up for its decrease in volume, be pulped up with more partially treated material and circuit solution and pumped back into the filter press so as to again fill the press and make another complete charge. After this has been done more circuit solution is pumped in by the washing pump until a test shows that the quantity of free acid leaving the filter press is about the same as that entering it. Thereupon the circuit solution is shut off and enough water is pumped in to displace the remaining circuit solution and the completely extracted material is discharged. As an alternative to this procedure, the press having been filled as first described, and the bulk of the zinc having been extracted by washing with the acid solution, as before described, the washing operations may be stopped and enough pulped up fines to fill up the press may be pumped in, after which washing can be continued as usual. In place of the filter press, other filters can be used such as vacuum filters of the drum or leaf type.

Sometimes practically all the soluble zinc is extracted during one filter press treatment, that is to say, having discharged the material from the filter press, it is not necessary to put it back again for further treatment along with some more partly treated material, as described above, or to pump more pulped up fines into the filter press, which as described above, is an alternative method to the same end. Exactly the same remark applies to the leaching of the coarse material in the leaching tanks; at times practically all the soluble zinc is extracted in the first leaching tank and therefore transference to the second tank as previously described is not necessary. The residues from the filter press are treated for their metal values in the same way as the residues from leaching of the coarse material; these residues containing all the lead, silver, etc., and some of the copper as previously stated.

The solution of zinc runs clear from the filter press or leaching tanks. In proportion as the roast has been a sulfate roast, the first runnings from the press are rich in zinc sulfate. After the first running, the zinc will form a comparatively dilute solution which will be mainly zinc sulfite. This solution from the filter press may contain say 0.5% to 1% of zinc more than the average zinc contents of the circuit solution.

If the solution contains only zinc sulfate no oxidation is necessary. If the solution contains zinc sulfite it is subjected to an oxidizing process to convert the zinc into sulfate. This oxidation is necessary mainly for three reasons:—(1) Because the solution sent back to the top of the absorption tower should be practically free from sulfites in order that it may be capable of absorbing the maximum amount of available $SO_2$. (2) Because $SO_2$ or sulfites would interfere with the precipitation of copper by zinc dust or scrap iron. (3) Because zinc sulfite in absence of free $SO_2$ will crystallize in the pipe lines.

Preferably the oxidation of the solution is carried out in tanks "M" and "N" to each of which is connected at the bottom a centrifugal pump which discharges the solution back into the top of the tank while atmospheric or compressed air is admitted into the inlet of the centrifugal pump. By these means the solution is brought into intimate contact with air in a finely divided state and zinc sulfite is changed into sulfate. The solution may then if necessary be treated for the precipitation of copper either by zinc dust or scrap iron. In the case where the zinc dust is used an apparatus "O" similar to that just described may be utilized, the zinc dust going around with the solution through the tank and centrifugal pump. This procedure is mechanically similar to the oxidizing procedure but without the introduction of the air. The solution thus treated and containing zinc sulfate is split, that is to say, a portion is removed and evaporated for the precipitation of as much zinc as is necessary to maintain the equilibrium of the circuit. The remainder of the circuit solution is made up to normal quantity by the final water-washings used in the leaching tank and (or) filter press. The circuit solution is then returned to the absorption tower. Thus all solution removed for precipitation (evaporation) of the zinc values is first oxidized (if it contains much sulfite) and is then treated with zinc dust as described or by other means for the removal of copper, and this solution removed for precipitation of zinc values primarily consists of the rich sulfate solution with enough circuit solution added to maintain the average zinc contents of the solution and thereby daily to remove as much zinc as is daily added. Similarly all the remainder of the solution from filter presses or leaching tanks is oxidized to convert the greater part of the sulfites into sulfates before this solution is again sent to the absorption towers to absorb more $SO_2$.

The precipitation of the solution can be done by any convenient method of evaporation, for example in a reverberatory furnace "H", first to form zinc sulfate, then anhydrous zinc sulfate and then zinc oxid by calcination.

What I claim as my invention and desire to secure by Letters Patent is:—

1. The herein-described process for the extraction of zinc from its ores which consists in roasting the ore so as to convert most of the zinc into sulfate, passing the furnace gases through circuit solution fairly free from sulfites so as to form a solution of sulfur dioxid, and subjecting the roasted ore simultaneously to leaching with a solution of sulfur dioxid and to pressure filtration so as to leach out the zinc sulfate from the ore and dissolve out the remaining zinc in the form of sulfates and sulfites.

2. The herein described process for the extraction of zinc from its ores which consists in roasting the ore, passing the furnace gases through circuit solution containing metallic sulfates but fairly free from sulfites so as to produce a solution of sulfur dioxid, and leaching the ore with the said solution of sulfur dioxid.

3. The herein described process for the extraction of zinc from its ores which consists in roasting the ore so as to produce mainly sulfate of zinc, passing the furnace gases through circuit solution containing metallic sulfates but fairly free from sulfites so as to produce a solution of sulfur dioxid, and leaching the ore with the said solution of sulfur dioxid whereby the first runnings from the leached ore are rich in sulfates while the solution subsequently obtained by the action of the solvent liquor on the ore contains metallic sulfites.

4. The herein described process for the extraction of zinc from its ores which consists in roasting the ore so as to produce mainly sulfate of zinc, passing the furnace gases through circuit solution containing metallic sulfates but fairly free from sulfites so as to produce a solution of sulfur dioxid, and leaching the ore with the said solution of sulfur dioxid to produce first solutions rich in sulfate and subsequently solutions containing metallic sulfites, and oxidizing the sulfite-containing solutions so as to convert the sulfites into sulfates.

5. The herein described process for the extraction of zinc from its ores which consists in roasting the ore so as to convert most of the zinc into sulfate, passing the furnace gases through circuit solution fairly free from sulfites so as to form a solution of sulfur dioxid, subjecting the roasted ore simultaneously to leaching with a solution of sulfur dioxid and to pressure filtration so as to leach out the zinc sulfate from the ore and dissolve out the remaining zinc in the form of sulfates and sulfites, oxidizing the sulfite containing solution so as to convert the sulfites into sulfates, splitting off a portion of the whole amount of the solution of zinc sulfate thus obtained for the extraction of the zinc therefrom and making up the circuit solution from the remainder of the sulfate solutions together with the requisite amount of water to replace the solution split off.

6. The herein described process for the extraction of zinc from its ores which consists in roasting the ore so as to convert most of the zinc into sulfate, passing the furnace gases through circuit solution fairly free from sulfites so as to form a solution of sulfur dioxid, subjecting the roasted ore simultaneously to leaching with a solution of sulfur dioxid and to pressure filtration so as to leach out the zinc sulfate from the ore and dissolve out the remaining zinc in the form of sulfates and sulfites, oxidizing the sulfite containing solution by means of air so as to convert the sulfites into sulfates, splitting off a portion of the whole amount of the solution of zinc sulfate thus obtained, precipitating the copper from the split off portion of the solution of zinc sulfate, and evaporating the purified solution of zinc sulfate so as first to form zinc sulfate then anhydrous zinc sulfate and then zinc oxid by calcination.

7. The herein described process for the extraction of zinc from its ores which consists in roasting the ore so as to convert most of the zinc into sulfate, passing the furnace gases through circuit solution fairly free from sulfites so as to form a solution of sulfur dioxid, subjecting the roasted ore simultaneously to leaching with a solution of sulfur dioxid and to pressure filtration so as to leach out the zinc sulfate from the ore and dissolve out the remaining zinc in the form of sulfates and sulfites, oxidizing the sulfite containing solution by means of air so as to convert the sulfites into sulfates, splitting off a portion of the whole amount of the solution of zinc sulfate thus obtained, precipitating the copper from the split off portion of the solution of zinc sulfate, and evaporating the purified solution of zinc sulfate so as first to form zinc sulfate then anhydrous zinc sulfate and then zinc oxid by calcination and making up the circuit solution from the remainder of the sulfate solution, together with the requisite amount of water to replace the solution split off.

8. The herein described process for the extraction of zinc from its ores which consists in first roasting the ore so as to obtain most of the metals in the form of sulfate, separating the product thus obtained into a coarse leachable material and a fine non-leachable material, leaching the coarse material with a solution of sulfur dioxid so as to produce first solutions of zinc sulfate and then solutions of zinc sulfite and sulfate, forming a pulp of the fine non-leachable material, subjecting the said pulp simultaneously to leaching with a solution of sulfur dioxid and to pressure filtration so as to produce first solutions of zinc sulfate and then solutions of zinc sulfate and zinc sulfite, utilizing part of the zinc-containing solutions for the extraction of the zinc therefrom and the remainder of the said solutions for the circuit liquor, and treating the residues from the coarse and fine materials for the recovery of any metals contained therein.

9. The herein described process for the extraction of zinc from its ores which consists in first roasting the ore so as to obtain most of the metals in the form of sulfate, separating the product thus obtained into a coarse leachable material and a fine non-leachable material, leaching the coarse material with a solution of sulfur dioxid so as to produce first solutions of zinc sulfate and then solutions of zinc sulfite and sulfate, forming a pulp of the fine non-leachable material, subjecting the said pulp simultaneously to leaching with a solution of sulfur dioxid and to pressure filtration so as to produce first solutions of zinc sulfate and then solutions of zinc sulfate and zinc sulfite, collecting the first runnings rich in zinc sulfate obtained from both the coarse leachable material and the fine non-leachable material separately from the subsequent solutions leached from the ore poor in sulfate and containing sulfite, oxidizing the sulfite-containing solutions so as to convert the sulfites into sulfates, splitting off a portion of the sulfite-containing solutions and removing the copper therefrom by precipitation with zinc, evaporating the purified solution of zinc sulfate so as to finally produce zinc oxid, and returning the remainder of the sulfate solution, without removing any copper that may be contained therein, to the main circuit for the absorption of sulfur dioxid.

10. The herein described process for the extraction of zinc from its ores which consists in first roasting the ore so as to obtain most of the metals in the form of sulfate, separating the product thus obtained into a coarse leachable material and a fine non-leachable material, leaching the coarse material with a solution of sulfur dioxid so as to produce first solutions of zinc sulfate and then solutions of zinc sulfite and sulfate, forming a pulp of the fine non-leachable material, subjecting the said pulp simultaneously to leaching with a solution of sulfur dioxid and to pressure filtration so as to produce first solutions of zinc sulfate and then solutions of zinc sulfate and zinc sulfite, collecting the first runnings rich in zinc sulfate obtained from both the coarse leachable material and the fine non-leachable material separately from the subsequent solutions leached from the ore poor in sulfate and containing sulfite, oxidizing the sulfite-containing solutions so as to convert the sulfites into sulfates splitting off a portion of the sulfite-containing solutions and removing the copper therefrom by precipitation with scrap iron, evaporating the purified solution of zinc sulfate so as to finally produce zinc oxid, and returning the remainder of the sulfate solution, without removing any copper that may be contained therein, to the main circuit for the absorption of sulfur dioxid.

11. The herein described apparatus for carrying out a continuous process for the extraction of zinc from its ores comprising a furnace wherein the ore is roasted in free contact with air, a tower into which the circuit solution is delivered and through which the furnace gases are passed so as to produce a solution of sulfur dioxid, storage tanks for the solution of sulfur dioxid leaving the tower, tanks in which the coarse leachable ore is treated with the leaching solution, tanks for pulping up the fine non-leachable material, filter presses into which the fine material is introduced and leached, tanks for collecting separately the solutions rich in sulfate, the neutral solutions poorer in zinc and the acid solutions containing zinc sulfite, tanks provided with centrifugal pumps for oxidizing the sulfite solutions and for the precipitation of copper, tanks for storing the purified sulfate solutions, and a reverberatory furnace for evaporation of the zinc sulfate solution and recovery of the zinc therefrom in the form of zinc oxid.

In testimony whereof I have signed my name to this specification in the presence of two subscribing witnesses.

HENRY THOMAS DURANT.

Witnesses:
VICTOR ARMSTRONG WATERS,
THOMAS HENRY HOPPÉ.